United States Patent [19]

Syrier et al.

[11] Patent Number: 5,229,445
[45] Date of Patent: Jul. 20, 1993

[54] STABILIZED OLEFIN/CARBON MONOXIDE COPOLYMERS

[75] Inventors: Johannes L. M. Syrier; Hendrik Van De Weg, both of Cm Amsterdam, Netherlands

[73] Assignee: Shell Oil Company, Houston, Tex.

[21] Appl. No.: 839,655

[22] Filed: Feb. 19, 1992

Related U.S. Application Data

[63] Continuation of Ser. No. 304,080, Jan. 31, 1989, abandoned.

[30] Foreign Application Priority Data

Feb. 10, 1988 [GB] United Kingdom ............ 8803035

[51] Int. Cl.⁵ .................................................. C08K 5/20
[52] U.S. Cl. ................................. 524/222; 524/291
[58] Field of Search ........................................ 524/222

[56] References Cited

U.S. PATENT DOCUMENTS

| | | |
|---|---|---|
| 2,495,286 | 1/1950 | Brubaker . |
| 3,026,264 | 3/1962 | Rocklin et al. . |
| 3,285,855 | 11/1966 | Dexter et al. . |
| 3,637,582 | 1/1972 | Gilles . |
| 3,644,538 | 2/1972 | Starnes, Jr. . |
| 3,676,401 | 7/1972 | Henry . |
| 3,694,412 | 9/1972 | Nozaki . |
| 3,707,542 | 12/1972 | Steinberg et al. . |
| 3,707,543 | 12/1972 | Steinberg et al. . |
| 3,723,427 | 3/1973 | Susi . |
| 3,753,952 | 8/1973 | Guillet et al. . |
| 3,929,727 | 12/1975 | Russell et al. . |
| 3,935,141 | 1/1976 | Potts et al. . |
| 3,948,832 | 4/1976 | Hudgin . |
| 4,024,104 | 5/1977 | Russell et al. . |
| 4,076,911 | 2/1978 | Fenton ................... 528/392 |
| 4,145,556 | 3/1979 | Hirsch et al. . |
| 4,192,942 | 3/1980 | Mainord ................. 528/392 |
| 4,761,448 | 8/1988 | Kluttz et al. ............ 524/612 |
| 4,761,453 | 8/1988 | Allen ..................... 524/612 |
| 4,795,774 | 1/1989 | Kluttz ..................... 524/255 |
| 4,798,884 | 1/1989 | Brons et al. ............. 528/392 |
| 4,857,570 | 8/1989 | Smutny .................. 528/112 |
| 4,880,903 | 11/1989 | Van Broekhoven et al. ...... 528/392 |
| 4,992,499 | 2/1991 | Syrier et al. ............ 524/255 |
| 5,079,340 | 1/1992 | Auerback et al. ......... 524/255 |

FOREIGN PATENT DOCUMENTS

| | | |
|---|---|---|
| 121965 | 10/1984 | European Pat. Off. . |
| 181014 | 5/1986 | European Pat. Off. . |
| 222454 | 5/1987 | European Pat. Off. . |
| 257663 | 3/1988 | European Pat. Off. . |
| 1081304 | 8/1967 | United Kingdom . |

OTHER PUBLICATIONS

Groenewege et al., "Crystalline Olefin Polymers-Part I", Raff & Doak, editors (1965), pp. 719, 772, 773.
Osawa et al., "Stabilization and Degradation of Polymers", Allara & Hawkins, editors (1978), pp. 159-173.
Hawkins et al., "Crystalline Olefin Polymers-Part II", Raff & Doak, editors (1965), pp. 361-398.
R. Leaversuch, *Modern Plastics*, (1987), pp. 52-55.

Primary Examiner—Veronica P. Hoke

[57] ABSTRACT

Linear alternating polymers of carbon monoxide and at least one ethylenically unsaturated hydrocarbon are stabilized against thermal degradation by the inclusion therein of certain phenolic compounds.

14 Claims, No Drawings

STABILIZED OLEFIN/CARBON MONOXIDE COPOLYMERS

This is a continuation of application Ser. No. 07/304,080, filed Jan. 31, 1989, now abandoned.

FIELD OF THE INVENTION

The present invention relates to compositions comprising a linear alternating polymer of carbon monoxide and at least one ethylenically unsaturated hydrocarbon. More particularly, the invention relates to compositions comprising such polymers stabilized against thermal degradation by the inclusion therein of certain phenolic compounds as stabilizers.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produces similar polymers of higher carbon monoxide content in the presence of alkylphosphine complexes of palladium as catalyst. Nozaki extended the process to produce linear alternating polymers through the use of arylphosphine complexes of palladium and certain inert solvents, e.g., U.S. Pat. No. 3,694,412.

More recently the class of linear alternating polymers of carbon monoxide and at least one ethylenically unsaturated hydrocarbon has become of greater interest in part because of the greater availability of the polymers. The more recent general process for the production of the polymers is illustrated by Published European Patent Applications 121,965, 181,014, 222,454 and 257,663 among others. The process generally involves the use of a catalyst system formed from a compound of a Group VIII metal selected from palladium, cobalt or nickel, the anion of a non-hydrohalogenic acid having a pKa below about 6 and a bidentate ligand of phosphorous, arsenic or antimony.

The resulting polymers are relatively high molecular weight materials having utility as premium thermoplastics in the production of shaped articles such as containers for food and drink and as parts and housings for the automotive industry. Although the polymers are relatively stable, the linear alternating polymers do undergo to some degree the degradation upon exposure to elevated temperature which is characteristic of most if not all organic polymers.

Russell et al, U.S. Pat. No. 3,929,729 and U.S. Pat. No. 4,024,104, teach the use of certain benzoquinones and of certain benzotriazoles as thermal stabilizers for certain polymers of carbon monoxide and ethylene with optional third monomers, but the polymers tested are limited and the disclosure does not appear to be directed solely towards linear alternating polymers. In fact, a number of conventional thermal stabilizers that are usefully employed with one or more other premium thermoplastics do not appear to effectively stabilize the linear alternating polymers of carbon monoxide and at least one ethylenically unsaturated hydrocarbon. It would be of advantage to provide for efficient stabilization of such polymers against thermal degradation.

SUMMARY OF THE INVENTION

The invention relates to certain polymeric compositions stabilized against thermal degradation and to a method for the stabilization of the polymers. More particularly, the invention relates to compositions comprising linear alternating polymers of carbon monoxide and at least one olefinically unsaturated hydrocarbon, which compositions are stabilized against thermal degradation by the inclusion therein of certain organic phenolic compounds as stabilizers.

DESCRIPTION OF THE INVENTION

The polymers which are stabilized according to the invention are the linear alternating polymers of carbon monoxide and at least one ethylenically unsaturated hydrocarbon which are often referred to as polyketones or polyketone polymers. The ethylenically unsaturated hydrocarbons which are useful as precursors of the polyketone polymers have up to 20 carbon atoms, inclusive, preferably up to 10 carbon atoms, inclusive, and are aliphatic such as ethylene and other alpha-olefins including propylene, 1-butene, isobutylene, 1-octene and 1-dodecene, or are arylaliphatic containing an aryl substituent on an otherwise aliphatic molecule, particularly an aryl substituent on a carbon atom of the ethylenic unsaturation. Examples of the latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

When the preferred terpolymers of carbon monoxide, ethylene and a second hydrocarbon are employed in the compositions of the invention there will be at least two units incorporating a moiety of ethylene for each unit incorporating a moiety of the second hydrocarbon. Preferably there will be from about 10 units to about 100 units incorporating a moiety of ethylene for each unit incorporating a moiety of second hydrocarbon. The polymer chain of the preferred polymers is therefore represented by the repeating formula $$+CO(CH_2-CH_2)\!\!+_{\overline{x}}\!\!+CO(G)\!\!+_y \qquad (I)$$

wherein G is a moiety of a second hydrocarbon polymerized through the ethylenic unsaturation thereof and the ratio of y:x is no more than 0.5. The —CO(CH$_2$—CH$_2$)— units and the —CO(G)— units are formed randomly throughout the polymer chain. In the modification which employs copolymers of carbon monoxide and ethylene without the presence of a second hydrocarbon the polymers are represented by the above formula I wherein y is 0. When y is other than 0, i.e., terpolymers are employed, ratios of y:x from about 0.01 to about 0.1 are preferred. The end groups or "caps" of the polymer chain will depend upon what materials were present during the production of the polymer and how and whether the polymer had been purified. The precise nature of the end groups is of little significance so far as the overall properties of the polymer are concerned, however, so that the polymer is fairly represented by the polymer chain as depicted above.

Of particular interest are the polymers of the above formula I having a molecular weight of from about 2000 to about 200,000, particularly those polymers of molecular weight from about 6,000 to about 30,000. The physical properties of such polymers will depend in part upon the molecular weight, whether the polymer is a copolymer or a terpolymer and, in the case of terpolymers, the relative proportion of the second hydrocarbon present. Typical melting points of such polymers are from about 175° C. to about 280° C., more often from about 210° C. to about 270° C.

The polymers are produced by the general methods illustrated by Published European Patent Applications 121,965, 181,014, 222,454 and 257,663. Although the scope of the polymerization process is extensive, a preferred catalyst is formed from a mixture of palladium acetate, the anion of trifluoroacetic acid or p-toluenesulfonic acid and a bidentate ligand selected from 1,3-bis(diphenylphosphino)propane or 1,3-bis[di(2-methoxyphenyl)phosphino]propane.

The polyketone polymers of the invention are stabilized against degradation caused by exposure to elevated temperature by the inclusion therein of a stabilizing quantity of certain organic phenolic stabilizers. The choice of a particular type of stabilizer is of some criticality since some conventional thermal stabilizers known to be useful for stabilizing other polymers are not effective in the case of the linear alternating polyketone polymers.

The thermal stabilizers of the invention are selected from the classes of:
1. Bis- or tris-phenolic alkanes,
2. Tris-phenolic alkylbenzenes
3. Tris-phenolic cyanurates, or
4. Symmetrical diesters of phenolic alkanoic acids and N,N'-di(hydroxyalkyl)oxalamide, wherein each phenolic moiety is substituted with at least one alkyl group and preferably with at least two alkyl groups, at least one of which sterically hinders the hydroxyl group of the phenolic moiety. Such alkyl groups have from 1 to 6 carbon atoms, inclusive, but preferably have from 3 to 5 carbon atoms, inclusive, and are branched alkyl, e.g., isopropyl, isobutyl, t-butyl and t-amyl.

The first class of stabilizers of the invention comprises alkane moieties of up to 6 carbon atoms containing from 2 to 3 hindered hydroxy phenyl substituents. Illustrative of such stabilizers are bis(2-hydroxy-3-t-butyl-5-methylphenyl)methane, bis(4-hydroxy-3,5-di-t-butylphenyl)methane, 1,1,2-tris(4-hydroxy-3-t-butyl-6-methylphenyl)propane 1,1-bis(2-hydroxy-3-t-butyl-5-ethylphenyl)ethane, bis(4-hydroxy-3-t-amylphenyl)methane, 1,2-bis(4-hydroxy-3,5-di-t-butylphenyl)ethane and bis(2-hydroxy-3-t-butyl-5-n-butylphenyl)methane. The bis-phenolic methanes are the preferred members of this class, particularly those wherein at least one of the alkyl substituents on the phenolic moiety is t-butyl.

The second class of the stabilizers of the invention have three hindered hydroxyphenyl or three hindered hydroxybenzyl groups attached to a benzene ring wherein at least one alkyl substituent is also found on the benzene ring. Preferably, each of the central benzene ring carbon atoms not substituted with a phenolic group is substituted with an alkyl group of up to 6 carbon atoms, preferably methyl. Illustrative of such compounds are 1,3,5-tris(4-hydroxy-3,5-di-tertbutylphenyl)-2,4,6-trimethylbenzene, 1,2,4-tris(4-hydroxy-5-t-amylphenyl)-3,5,6-trimethylbenzene and 1,3,5-tris(4-hydroxy-3-t-butylphenyl)-2,4,6-trimethylbenzene. Mesitylene derivatives are particularly preferred, especially 1,3,5-tris(4-hydroxy-3,5-di-t-butylphenyl)-2,4,6-trimethylbenzene.

The third class of stabilizers of the invention have three hindered hydroxyphenyl or three hindered hydroxybenzyl substituents on a cyanurate nucleus. Illustrative of such compounds are tris(4-hydroxy-3, 5-di-t-butylphenyl)cyanurate, tris(2-hydroxy-3-t-butylphenyl)cyanurate, tris(4-hydroxy-3,5-di-t-amylbenzyl)cyanurate and tris(4-hydroxy-3,5-di-t-butylbenzyl)cyanurate. Among the phenolic cyanurates the tris (hindered hydroxybenzyl) derivatives are preferred, particularly tris(4-hydroxy-3,5-di-t-butylbenzyl)cyanurate.

The fourth class of the stabilizers of the invention are symmetrical diesters of hindered hydroxyphenyl alkanoic acids and N,N'-di(2-hydroxyethyl)oxalamide, wherein the alkanoic moieties have from 2 to 6 carbon atoms inclusive, but preferably are propionic moieties, and the alkyl moieties have up to 6 carbon atoms inclusive, but preferably have 2 carbon atoms. Illustrative of the stabilizers of this class is the diester of 3-(4-hydroxy-3,5-di-t-butylphenyl)propionate and N,N'-di(2-hydroxyethyl)oxalamide, the diester of 3-(4-hydroxy-3-t-butyl-5-methylphenyl)propionic acid and N,N'-di(3-hydroxypropyl)oxalamide and the diester of 3-(2-hydroxy-3-t-amyl-5-t-butylphenyl)propionic acid and N,N'-di(2-hydroxyethyl)oxalamide. The diester of 3-(4-hydroxy-3-t-butyl-5-methylphenyl)propionic and N,N'-di(3-hydroxypropyl)oxalamide is preferred.

The stabilizer as defined above is employed in a quantity sufficient to effectively stabilize the polyketone polymer against thermal degradation. Such stabilizing quantities are from about 0.05% by weight to about 3% by weight, based on the polyketone polymer, but preferably are from about 0.1% by weight to about 2% by weight on the same basis.

The stabilizer is added to the polyketone polymer by conventional methods suitable for producing an intimate mixture of the polymer and the stabilizer without unduly degrading the polymer or the stabilizer. Such methods include the dry blending of the stabilizer and the polymer in a finely divided form followed by hot pressing, mixing the polymer and the stabilizer and passing the mixture through an extruder to form the blend as an extrudate, or by intimate mixing in a mixer or a blender operating at high shear The stabilized compositions may also contain other additives such as colorants, plasticizers, fibers, reinforcements and dyes which are added to the polymer together with or separately from the stabilizer.

The stabilized polyketone polymers are useful in the production of fibers, films, sheets, containers, wires and cables and shaped parts which are produced by conventional methods such as extrusion, injection molding and thermoforming. The compositions are useful in applications where the finished product is likely to be subjected to elevated temperatures because of the enhanced thermal stability of the composition as compared with the polymer alone.

The invention is further illustrated by the following Illustrative Embodiment and Comparative Example (not of the invention) which should not be regarded as limiting.

ILLUSTRATIVE EMBODIMENT

Test specimens were prepared from a linear alternating terpolymer of carbon monoxide, ethylene and propylene having a melting point of 231° C. and an intrinsic viscosity, measured in m-cresol at 60° C., of 2.3 dl/g.

The specimens were 1 mm thick, 3 mm wide and 30 mm long and were prepared by compression molding of a mixture of the polymer and a candidate stabilizer at 250° C. The specimens were subjected to aerobic oven aging tests at two different temperatures. During testing, the specimens were periodically bent to an angle of 180° by hand and the appearance of cracks was recorded as brittleness (failure). The time of heating until brittleness in the oven was recorded. The six candidate stabilizers were the following:

A. Bis(2-hydroxy-3-t-butyl-5-methylphenyl)methane
B. Bis(4-hydroxy-3,5-di-t-butylphenyl)methane
C. 1,1,2-Tris(4-hydroxy-3-t-butyl-6-methylphenyl)propane
D. Tris(4-hydroxy-3,5-di-t-butylbenzyl)cyanurate
E. 1,3,5-Tris(4-hydroxy-3,5-di-t-butylbenzyl)-2,4,6-trimethylbenzene
F. Diester of N,N'-bis(2-hydroxyethyl)oxalamide and 3-(4-hydroxy-3,5-di-t-butylphenyl)propionic acid.

All candidate stabilizers were employed at a level of 0.3% by weight based on terpolymer. The results of the oven testing are shown in Table I.

TABLE I

| Stabilizer | Time to failure (hours) heating at | |
|---|---|---|
| | 135° C. | 115° C. |
| A | 137 | 760 |
| B | 87 | not determined |
| C | 97 | 365 |
| D | 65 | not determined |
| E | 65 | 335 |
| F | 137 | 500 |

COMPARATIVE EXAMPLE

For purposes of comparison, test specimens containing the compounds

G. n-Octadecyl ester of 3-(4-hydroxy-3,5-di-t-butylphenyl)propionic acid, and
H. tetra ester of pentaerythritol and 3-(4-hydroxy-3,5-di-t-butylphenyl)propionic acid.

These compounds are commercial thermal stabilizers for polyethylene, polypropylene and polyamides. The specimens were evaluated by the procedure of the Illustrative Embodiment. The results are shown in Table II.

TABLE II

| Compound | Time to failure (hours) heating at | |
|---|---|---|
| | 135° C. | 115° C. |
| G | 30 | 161 |
| H | 28 | 142 |

What is claimed is:

1. A composition stabilized against thermal degradation consisting essentially of a linear alternating polyketone polymer of carbon monoxide and at least one ethylenically unsaturated hydrocarbon wherein the polymer is represented by repeating units of the formula

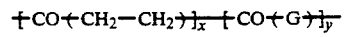

wherein G is the moiety of propylene polymerized through the ethylenic unsaturation thereof and the ratio of y:x is no more than about 0.5, and intimately mixed therewith from about 0.1% by weight to about 2% by weight, based on polyketone polymer, of a stabilizer selected from symmetrical diesters of phenolic alkanoic acids and N,N'-di(hydroxyalkyl)oxalamide, where in each phenolic moiety is substituted with at least one alkyl group which sterically hinders the hydroxyl group of the phenolic moiety.

2. The composition of claim 1 wherein y is 0.

3. The composition of claim 1 wherein the ratio of y:x is from about 0.01 to about 0.1.

4. The composition of claim 1 wherein the alkanoic acid moiety is a propionic acid moiety.

5. The composition of claim 1 wherein the hydroxyalkyl moiety is 2-hydroxyethyl.

6. The composition of claim 1 wherein the stabilizer is the diester of 3-(4-hydroxy-3,5-di-t-butylphenyl)propionic acid and N,N'-di(2-hydroxyethyl)oxalamide.

7. The composition of claim 1 wherein the stabilizer is the diester of 3-(4-hydroxy-3-t-butyl-5-methylphenyl)-propionic acid an N,N'-di(3-hydroxypropyl)oxalamide.

8. A method of stabilizing a linear alternating polyketone polymer of carbon monoxide and at least one ethylenically unsaturated hydrocarbon against thermal degradation by incorporating therein from about 0.1% by weight to about 2% by weight, based on polyketone polymer, of a phenolic stabilizer, wherein the polymer is represented by repeating units of the formula

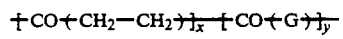

wherein G is the moiety of propylene polymerized through the ethylenic unsaturation thereof and the ratio of y:x is no more than about 0.5, and wherein the stabilizer is selected from symmetrical diesters of phenolic alkanoic acids and N,N'-di(hydroxyalkyl)oxalamide, wherein each phenolic moiety is substituted with at least one alkyl group which sterically hinders the hydroxyl group of the phenolic moiety.

9. The method of claim 8 wherein y is 0.

10. The method of claim 8 wherein the ratio of y:x is from about 0.01 to about 0.1.

11. The method of claim 8 wherein the alkanoic acid moiety is a propionic acid moiety.

12. The method of claim 8 wherein the hydroxyalkyl moiety is 2-hydroxyethyl.

13. The method of claim 8 wherein the stabilizer is the diester of 3-(4-hydroxy-3,5-di-t-butylphenyl)propionic acid and N,N'-di(2-hydroxyethyl)oxalamide.

14. The method of claim 8 wherein the stabilizer is the diester of 3-(4-hydroxy-3-t-butyl-5-methylphenyl)-propionic acid and N,N'-di(3-hydroxypropyl)oxalamide.

* * * * *